US012631150B2

(12) United States Patent
Bograd

(10) Patent No.: US 12,631,150 B2
(45) Date of Patent: **\*May 19, 2026**

(54) SYSTEMS AND METHODS FOR OFF-GRID VALIDATION TESTING WITH UNDERSIZED LOAD COMPRESSOR

(71) Applicant: DOOSAN ENERBILITY CO., LTD., Changwon-si (KR)

(72) Inventor: Alexander Bograd, Palm Beach Gardens, FL (US)

(73) Assignee: Doosan Enerbility Co., Ltd., Changwon-si (KR)

( * ) Notice: Subject to any disclaimer, the term of this patent is extended or adjusted under 35 U.S.C. 154(b) by 301 days.

This patent is subject to a terminal disclaimer.

(21) Appl. No.: 18/537,050

(22) Filed: Dec. 12, 2023

(65) Prior Publication Data

US 2025/0188881 A1     Jun. 12, 2025

(51) Int. Cl.
G01M 15/14         (2006.01)
F02C 9/18          (2006.01)
F02C 9/52          (2006.01)

(52) U.S. Cl.
CPC ................... F02C 9/52 (2013.01); F02C 9/18 (2013.01); G01M 15/14 (2013.01)

(58) Field of Classification Search
CPC ...... G01M 15/00; G01M 15/02; G01M 15/14; F02C 9/00; F02C 9/18; F02C 9/52
See application file for complete search history.

(56) References Cited

U.S. PATENT DOCUMENTS

2025/0189408 A1* 6/2025 Bograd ................. G01M 15/02

FOREIGN PATENT DOCUMENTS

KR         20240076523 A  *  5/2024  ........... F01D 21/003

OTHER PUBLICATIONS

Machine Translation of KR-20240076523-A (Year: 2024).*

* cited by examiner

*Primary Examiner* — Nguyen Q. Ha
(74) *Attorney, Agent, or Firm* — Shook, Hardy & Bacon L.L.P.

(57)         ABSTRACT

The present disclosure relates to off-grid testing of a gas turbine engine using an undersized load compressor as part of the testing apparatus. By lowering the pressure experienced by the gas turbine engine at its intake and/or exhaust, validation testing can be performed at the gas turbine's maximum combustion temperature and/or maximum cycle pressure ratio without exceeding the power output that the load compressor is able to absorb.

19 Claims, 6 Drawing Sheets

SYSTEMS AND METHODS FOR OFF-GRID VALIDATION TESTING WITH UNDERSIZED LOAD COMPRESSOR

TECHNICAL FIELD

The present disclosure relates to systems and methods for off-grid testing of a gas turbine engine, and more particularly, using an undersized load compressor to test a gas turbine with a full-speed full-load design power output that is greater than the maximum load of the load compressor.

BACKGROUND

Gas turbine engines used for power generation (e.g., large, land-based gas turbine engines) typically require an extensive set of validation tests to verify that they will perform across a wide variety of operating conditions. Historically, most validation testing occurred after a gas turbine engine was designed, built and installed at a facility and the gas turbine engine was connected to the electric grid (i.e., on-grid testing). This required the outlay of substantial capital before the gas turbine engine was proven to be effective.

Off-grid testing requires a mechanism for absorbing the power generated by the gas turbine engine. In other words, the mechanism provides a load for the gas turbine engine to work against. While off-grid testing has been attempted, the cost associated with such testing has proven to be inefficient and/or prohibitive. That is, the expense required to build a test facility and the test equipment is very high.

SUMMARY

At a high level, systems and methods described herein provide for off-grid validation testing of a gas turbine engine. The system includes a load compressor, an exhaust hood, an intake throttle, and a fluid conduit. The load compressor is configured to connect with the rotary shaft of a gas turbine engine to be tested and may comprise a load compressor having a maximum load rating that is less than the power generated by the gas turbine engine operating at full speed full load in target operating conditions (e.g., an undersized load compressor). The intake throttle is configured to be fluidly connected to the intake of the gas turbine engine for controlling airflow into the gas turbine engine, which thereby controls the pressure of the air at the intake of the gas turbine engine. The exhaust hood may be coupled to the exhaust port of the gas turbine engine for venting exhaust fluid from the gas turbine engine. The fluid conduit redirects compressed air generated by the load compressor into the exhaust hood to cause a pressure drop of the exhaust fluid at the downstream end of the gas turbine engine.

In operation, the system, by controlling the intake throttle to control the air intake into the gas turbine engine and by inducing a pressure drop in the exhaust fluid at the downstream end of the gas turbine engine, creates pressure conditions at the gas turbine engine's intake and exhaust that simulate the pressure conditions that the gas turbine engine would experience when operating at a higher altitude than the target operating conditions of sea level. By simulating high-altitude operating conditions (e.g., lower pressure at the intake and lower pressure at the exhaust of the gas turbine engine), the gas turbine engine's power output is reduced, allowing it to be operated across a wider range of its performance profile without exceeding the amount of power that the undersized load compressor is able to absorb.

Testing can thus be performed to validate the gas turbine engine's performance across a wider range of the gas turbine engine's operational envelope.

In an aspect, a system for off-grid testing of a gas turbine engine with an undersized load compressor is provided. The system includes a gas turbine engine having a full-speed full-load ("FSFL") design power output. The gas turbine engine includes a compressor having an air intake, a combustor, a gas turbine, a rotary shaft coupling the gas turbine to the compressor, and an exhaust hood coupled downstream of the gas turbine. The system also includes a load compressor having a maximum load smaller than the FSFL design power output of the gas turbine engine. The load compressor is mechanically coupled to the rotary shaft of the gas turbine engine. The load compressor has an exhaust port and an inlet throttle configured to reduce the air pressure at the load compressor air inlet to facilitate gas turbine starting. The system further includes an injection nozzle in fluid communication with the exhaust hood of the gas turbine engine and a bypass conduit fluidly connecting the exhaust port of the load compressor with the injection nozzle for communicating high-pressure fluid to the exhaust hood of the gas turbine engine. According to an aspect, the maximum load of the load compressor is between 70% and 75% of the FSFL design power output of the gas turbine engine. In an aspect, the velocity of compressed air passing through the nozzle can be adjusted.

In another aspect, the system also includes a bypass throttle fluidly connected to the bypass conduit that is capable of limiting a flow of compressed air from the load compressor into the bypass conduit.

In aspects, the system further includes a control system configured to control operation of the system through the various states of a validation test cycle, including startup, shutdown, steady state, partial loads, and full load states. According to this aspect, the control system is operatively coupled to one or more of the gas turbine engine air intake throttle, the gas turbine engine fuel injector, the bypass throttle, and an electric starter motor mechanically coupled to the rotary shaft. According to this aspect, one or more sensors may be communicatively coupled with the control system and capable of measuring one or more operating conditions within or proximate the gas turbine engine.

According to another exemplary embodiment, a method of off-grid testing a gas turbine engine with an undersized load compressor includes the steps of: mechanically coupling a rotary shaft of the gas turbine engine with a rotary shaft of the load compressor, wherein the gas turbine engine has a FSFL design power output and the load compressor has a maximum load smaller than the FSFL design power output of the gas turbine engine; simulating an operating condition for the gas turbine engine using high-pressure air generated by the load compressor; and generating test data based on the simulation of the operating condition. According to this aspect, the step of simulating an operating condition includes establishing a first pressure within an exhaust hood of the gas turbine engine that is less than an ambient air pressure. According to this aspect, the method further includes the step of operating the gas turbine engine at the FSFL design power output for the first pressure. Also according to this aspect, the step of simulating an operating condition further comprises establishing an air intake pressure at an air intake of the gas turbine engine that matches the first pressure. According to another aspect, an exhaust hood is fluidly coupled to a discharge port of the gas turbine engine and a bypass conduit is fluidly coupled between an exhaust port of the load compressor and the exhaust hood, the bypass conduit terminating in an injection nozzle, and the method further includes the step of injecting a portion of a second exhaust from the load compressor into a stream of a first exhaust from the gas turbine engine in the exhaust hood. In additional aspects, the bypass conduit includes an exhaust throttle and the air intake pressure is controlled by an intake throttle that is fluidly coupled to the air intake.

In additional aspects, the method includes the steps of adjusting the amount of second exhaust that is injected so that the gas turbine exhaust is at a second pressure that is less than the ambient pressure; and adjusting the intake air pressure to match the second pressure.

BRIEF DESCRIPTION OF THE DRAWINGS

The above and other aspects will become more apparent from the following description of the exemplary embodiments with reference to the accompanying drawings, in which.

Figure 1:
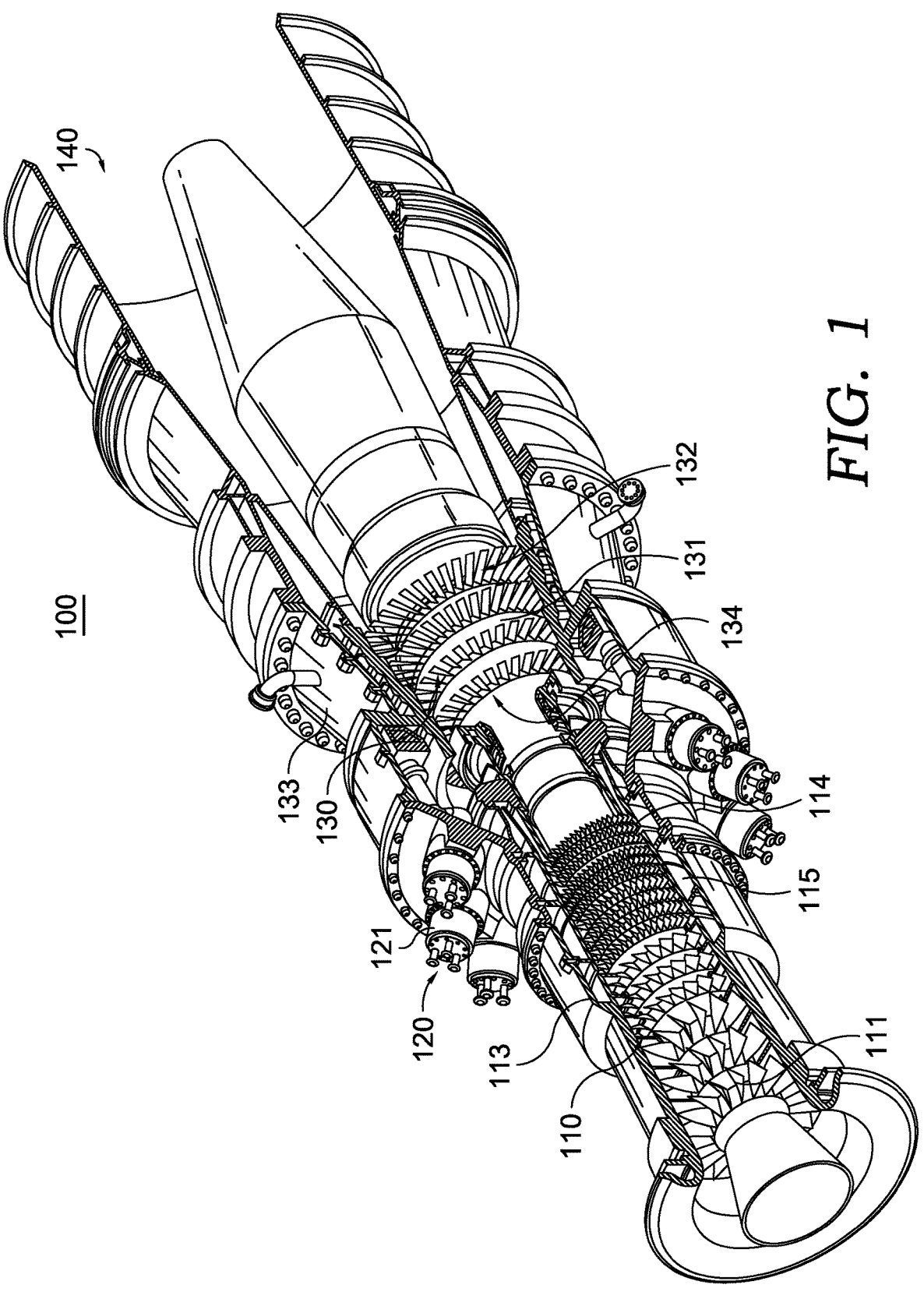
FIG. 1 is a perspective view illustrating an interior of a gas turbine engine according to an aspect described herein.

Examples will be described below in detail with reference to the accompanying drawings. It should be noted that like reference numerals refer to like parts throughout various drawings and examples. In certain embodiments, a detailed description of functions and configurations well known in the art may be omitted to avoid obscuring appreciation of the disclosure by those skilled in the art. For the same reason, some components may be exaggerated, omitted, or schematically illustrated in the accompanying drawings.

DETAILED DESCRIPTION

At a high level, systems and methods described herein provide for off-grid validation testing of a gas turbine engine. The system includes a load compressor, an exhaust hood, an intake throttle, and a fluid conduit. The load compressor is configured to connect with the rotary shaft of the gas turbine engine and may comprise a load compressor having a maximum load rating that is less than the power generated by the gas turbine engine operating at full speed full load in target operating conditions. The intake throttle is configured to be fluidly connected to the intake of the gas turbine engine for controlling airflow into the gas turbine engine, which thereby controls the pressure of the air at the intake of the gas turbine engine. The exhaust hood may be coupled to the exhaust port of the gas turbine engine for venting exhaust fluid from the gas turbine engine. The fluid conduit redirects compressed air generated by the load compressor into the exhaust hood to cause a pressure drop of the exhaust fluid at the downstream end of the gas turbine engine.

In operation, the system, by controlling the air intake into the gas turbine engine and by inducing a pressure drop in the exhaust fluid at the downstream end of the gas turbine engine, creates pressure conditions at the gas turbine engine's intake and exhaust that simulate the pressure conditions that the gas turbine engine would experience when operating at a higher altitude than the target operating conditions of sea level. By simulating high-altitude operating conditions (e.g., lower intake pressure and exhaust pressure at the gas turbine engine), the gas turbine engine's power output is reduced, allowing it to be operated across a wider range of its performance profile without exceeding the amount of power that the undersized load compressor is able to absorb. Testing can thus be performed to validate the gas turbine engine's performance across a wider range of the gas turbine engine's operational envelope.

Referring initially to FIG. 1, a perspective view of the interior of a gas turbine engine 100 according to an exemplary embodiment is depicted. The thermodynamic cycle of the gas turbine engine 100 according to the illustrated embodiment may follow a Brayton cycle. The Brayton cycle may consist of four phases including isentropic compression (adiabatic compression), isobaric heat addition, isentropic expansion (adiabatic expansion), and isobaric heat dissipation. In the Brayton cycle, thermal energy may be released by combustion of fuel in an isobaric environment after atmospheric air is sucked in through an inlet or intake and compressed to a high pressure, hot combustion gas may be expanded to be converted into kinetic energy, and exhaust gas with residual energy may then be discharged to the atmosphere. That is, the Brayton cycle may consist of four processes, i.e., compression, heating, expansion, and exhaust.

The gas turbine engine 100 using the above Brayton cycle may include a compressor 110, a combustor 120, and a turbine 130, as illustrated in FIG. 1. The compressor 110 of the gas turbine engine 100 may suck air from the outside and compress the air. The compressor 110 may supply the combustor 120 with the air compressed by compressor blades 113, and may supply cooling air to a hot region for cooling (e.g., components of the turbine 130). In some aspects, since the air sucked into the compressor 110 is subject to an adiabatic compression process therein, the pressure and temperature of the air that has passed through the compressor 110 increase.

The compressor 110 may be designed as a centrifugal compressor or an axial compressor. In general, the centrifugal compressor is applied to a small gas turbine engine, whereas the multistage axial compressor is applied to a large gas turbine engine 100 as illustrated in FIG. 1 because it is necessary to compress a large amount of air. In the multistage axial compressor, the compressor blades 113 of the compressor 110 rotate along with the rotation of rotor disks to compress air introduced thereinto while delivering the compressed air to rear-stage compressor vanes 114. The air is compressed increasingly to a high pressure while passing through the compressor blades 113 formed in a multistage manner.

The compressor 110 may be driven by power output from the turbine 130. To this end, a rotary shaft 111 of the compressor 110 may be coupled to a rotary shaft 134 of the turbine 130, as illustrated in FIG. 1. In a large gas turbine engine 100, the compressor 110 may require almost half of the power generated by the turbine 130 for driving.

The combustor 120 may mix the compressed air, which is supplied from the outlet of the compressor 110, with fuel for isobaric combustion to produce combustion gas with high energy. That is, the combustor 120 mixes the compressed air, which is supplied from the outlet of the compressor 110, with fuel for isobaric combustion to produce combustion gas with high energy. The combustor 120 is disposed downstream of the compressor 110 and includes a plurality of burners arranged annularly around a central axis of the gas turbine engine 100.

The turbine 130 includes a plurality of rotor disks 131 mounted on the rotary shaft 134 of the turbine 130, a plurality of turbine blades 132 radially arranged on each of the rotor disks 131, and a plurality of turbine vanes (not shown) positioned axially upstream before each stage of turbine blades 132. Each of the rotor disks 131 has a substantially disk shape and has a plurality of grooves formed on the outer peripheral portion thereof. The grooves are each formed to have a curved surface so that the turbine blades are inserted into the grooves, and the turbine vanes are mounted in a turbine casing 133. The turbine vanes are fixed so as not to rotate and serve to guide the direction of flow of the combustion gas to the next axially downstream stage of the turbine blades 132. The turbine blades 132 generate rotational force while rotating by the combustion gas. The combustion gas exits the gas turbine engine 100 through an exhaust port 140.

In simplified terms, the power (PW) generated by the turbine section of a gas turbine engine is the product of the mass flow rate (W) (mass being air+ fuel) times the specific heat ($C_p$) of air/fuel mixture times the change in temperature ($\Delta T$) across the turbine stage. That is, $PW=W \times C_p \times \Delta T$. The net power of the gas turbine is the power generated by the turbine section minus the work necessary to run the rest of the engine (e.g., work needed to run the compressor), and losses due to friction, heat loss, etc.

Before being placed in service, gas turbine engines undergo extensive validation testing to provide reasonable assurance that the gas turbine engine will meet expected operating requirements. The validation testing may include operating the gas turbine engine through a variety of operating modes (e.g., start up mode, full speed no load, full speed full load, etc.) as well as operating at partial loads. In some aspects, the validation testing may include operating the gas turbine engine through a wider range of conditions than those that are expected to be experienced in actual operation. Historically, most validation testing occurred after a gas turbine engine was designed, built, and installed at a facility. Once the gas turbine engine was installed at a facility it would be connected to the electric grid (i.e., on-grid testing). This required the outlay of substantial capital before the gas turbine engine was proven to be effective. If the gas turbine engine did not pass the validation testing, then it would have to be removed and modified before being reinstalled and retested. This required an additional outlay of substantial capital.

Off-grid testing requires a way to absorb the power generated from the gas turbine engine. One way to absorb the power generated from the gas turbine engine would be to build a load device (e.g., a compressor) that can operate at or above the max power generated by the gas turbine engine. For example, a gas turbine engine that outputs a net power of 100 MW could be coupled to a load compressor that is rated to operate at 100 MW or higher. Load compressors capable of handling the power generated by more modern gas turbine engines, however, are not readily available and very expensive to build, especially if they are intended to be used solely for validation testing purposes.

Often new gas turbine engines are built to increase the power generation capacity of a power plant. For example, a new gas turbine engine capable of generating more power may be built to replace an old gas turbine engine with a lower power rating. Instead of building a specialized compressor rig for validation testing of the new gas turbine engine, the compressor of the old gas turbine engine can instead be used. In addition to being readily available, such a pre-existing load compressor will have well known performance characteristics. Also, as noted above, a compressor from a large gas turbine engine may require a significant amount of power for driving, making it a good candidate for this task. However, if the net power generated by the gas turbine engine being tested is greater than it takes to run the older gas turbine engine's load compressor at its maximum load, then the new gas turbine engine's full range of operation at the upper ranges of its power output cannot be tested.

One previous method of attempting to address this shortcoming was to direct heated and compressed air into the airflow being introduced into the gas turbine engine during testing. This lowers the mass of air flow (heated air being less dense) into the gas turbine engine, reducing the maximum power output capable of being achieved. However, because the incoming air is also heated, this method negatively affects the ability to test different aspects of the gas turbine engine's performance, particularly in the regions of maximum performance. A gas turbine engine's designed performance is often limited by the maximum temperatures that can be sustained without damaging critical components. On a hot day for example, an increase in the temperature of the air coming in subsequently requires an adjustment of operating parameters to prevent exceeding these maximum temperatures. The gas turbine engine, therefore, by way of example cannot be tested at its compressor's maximum cycle pressure ratio or with its combustion burners operating at their maximum conditions on that hot day.

Figure 2:
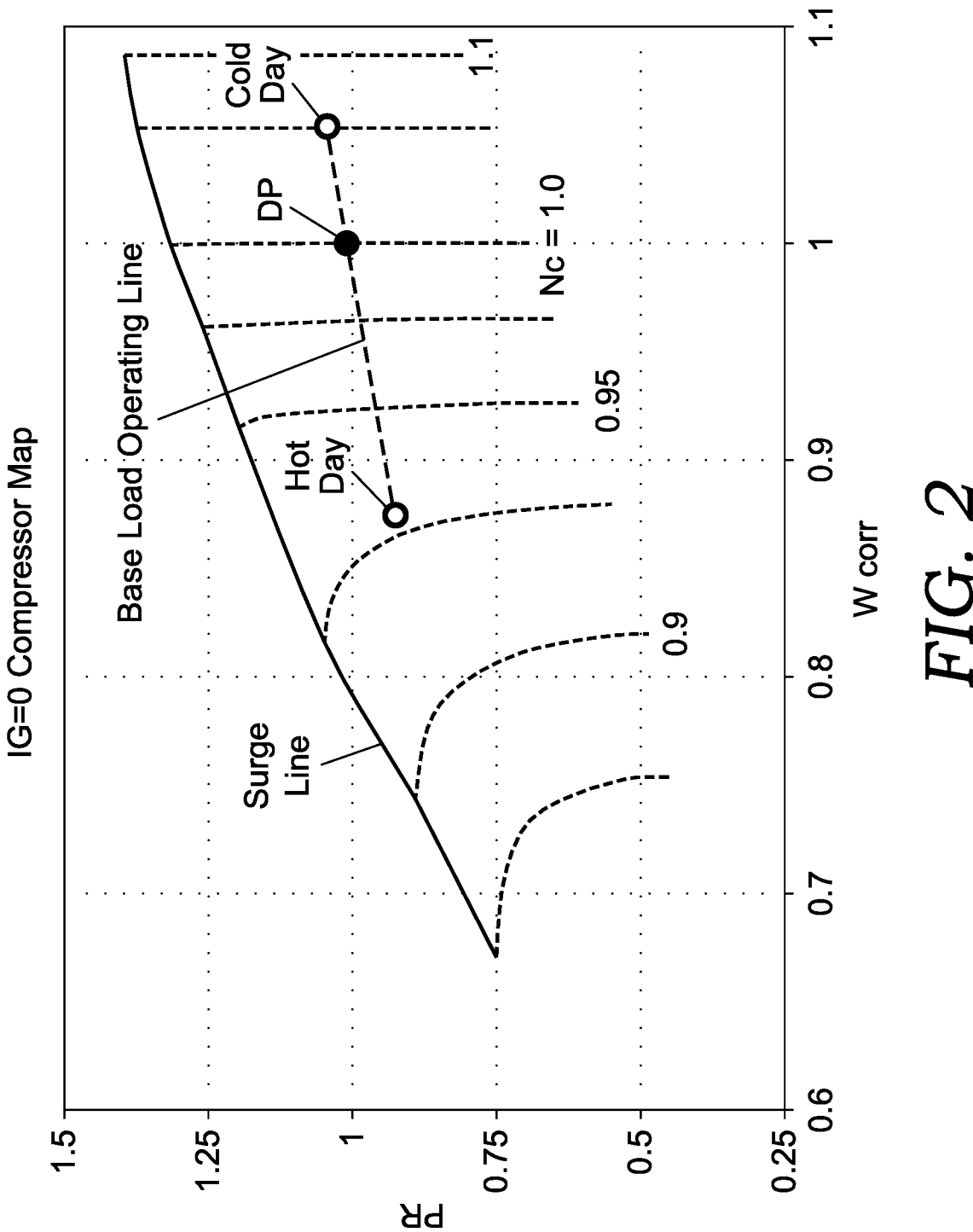
FIG. 2 provides a compressor map of an example gas turbine engine with a base load operating line.

The effects of intake air temperature on a gas turbine engine's performance can be seen in FIG. 2, which shows a cycle pressure ratio (PR) vs compressor intake corrected flow ($W_{corr}$) graph, with lines depicting various compressor corrected speed (Nc) values, for a particular geometry compressor. All parameters are presented in relative form in relation to the parameters at the design point DP; thus, at design point DP, the gas turbine engine being tested has a $W_{corr}$ of 1 when the gas turbine engine is operating with an Nc=1.0 and a PR=1, which will result in the gas turbine engine generating a first amount of power. The DP, however, is designated for the gas turbine engine's operation at a certain ambient temperature. As shown by the Base Load Operating Line, when the ambient temperature increases (e.g., on a hot day), the gas turbine engine must be operated at lower parameters (lower Nc, lower PR, lower $W_{corr}$) in order to prevent certain maximum temperatures within the gas turbine engine from being exceeded. Conversely, on cold days, the gas turbine engine can be run even at higher operational limits (e.g., PR, Nc and $W_{corr}$ greater than 1) without exceeding these temperature limits. Therefore, on a hot day for example, said particular gas turbine engine may not be fully tested anywhere along the base load operating line since the gas turbine engine may not be fully operating. A validation testing system, therefore, is ideally able to test the gas turbine engine's performance across this difference in operating temperatures as well. Thus, the previous methods, which reduce power out but increase the intake air temperature, are lacking.

The present invention addresses the above problems by recognizing that for a compressor with a particular geometry, a compressor map (such as the one in FIG. 2) can be defined using dimensionless and corrected parameters that will remain unchanged throughout the entire operating range of the compressor, e.g., it will be the same whether the compressor is operating at a higher or lower altitude. The system and methods described herein utilize this feature by reducing the air pressure at the gas turbine engine's intake and exhaust without an increase in the temperature of the air entering the intake of the gas turbine engine. First, at least some of the air that is compressed by the load compressor, instead of being directed into the intake of the gas turbine engine as in the above-mentioned previous method, is used to drop the pressure of the exhaust gas exiting the gas turbine engine into an exhaust hood coupled with the gas turbine engine exhaust port. Second, an air intake throttle is used to restrict the incoming airflow into the intake of the gas turbine engine. By reducing airflow mass (and pressure) without increasing the temperature of the air entering the gas turbine engine, power output is reduced to stay within the load compressor's limitations while allowing the gas turbine engine to be tested at higher levels of key parameters such as pressure ratio that more fully match those expected to be used in real-life operation. In fact, with the testing system and method discussed herein the gas turbine engine can be tested up to (and in some cases, beyond) a design point for all aspects (e.g., pressure, temperature, fluid dynamics, etc.) of the gas turbine engine except for the mechanical load on the rotary shaft of the gas turbine engine (e.g., 111, 134).

Figure 3:
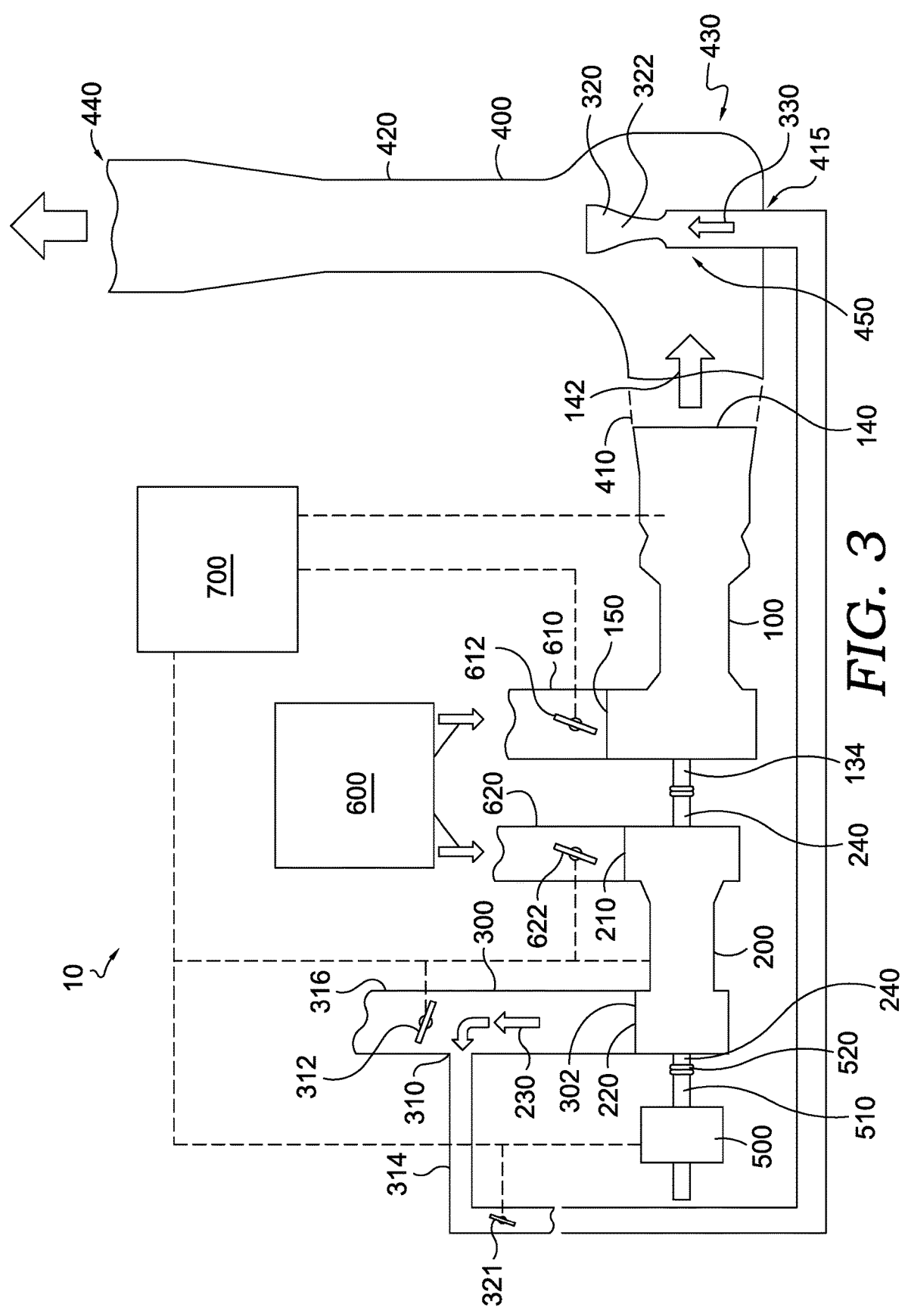
FIG. 3 is a schematic illustration of a system in accordance with an aspect described herein.

Referring now to FIG. 3, a validation testing system 10 is illustrated. The system 10 includes the gas turbine engine 100 to be tested. The gas turbine engine 100 is coupled with a load compressor 200 and connected to an exhaust hood 400. The gas turbine engine 100 includes an intake 150 through which air is introduced into the compressor section of the gas turbine engine 100. The intake 150 is connected to and fluidly coupled via an intake duct 610 to an air source 600, which may be a filter house. In other aspects, the air source can be the ambient atmosphere. An intake throttle 612 is positioned in the intake duct 610 and upstream from the intake 150 and is configured to regulate the flow of air and the pressure of the air as it flows from the air source 600 into the intake 150. In an example, the intake throttle 612 can be in the form of the gas turbine engine's own inlet guide vanes (IGV); in other examples, the intake throttle 612 can be a separate part of the system 10.

The exhaust hood 400 has a first end 410 that is fluidly coupled with the exhaust port 140 of the gas turbine engine 100. In some aspects, the exhaust hood 400 is directly coupled to the exhaust port 140 such that it abuts or is adjacent to the exhaust port 140. The body 420 of the exhaust hood 400 acts as a channel for the exhaust gas exiting from the turbine section of the gas turbine engine 100 to the second end 440 of the exhaust hood 400, where the exhaust gas can safely exit out into the ambient atmosphere. The body 420 may be configured to be generally straight or have one or more bends 430 depending upon the particulars of the facility in which the system 10 is situated. For example, the exhaust hood 400 may have one bend 430 that redirects the flow of exhaust gas from a horizontal flow generally aligned with the center axis of the gas turbine engine 100 to a vertical flow up and out of the exhaust hood 400.

In some aspects, a compressor from an existing gas turbine engine (i.e., not the gas turbine engine 100 being tested) may be used as a load compressor 200 functioning as a load device. The load compressor 200 may include a rotary shaft 240. The rotary shaft 240 may be coupled to the rotary shaft 134 of the gas turbine engine 100. In an aspect, the rotary shaft 134 of the gas turbine engine 100 and the rotary shaft 240 of the load compressor 200 may be directly coupled to each other via a mechanical coupling in a coaxial orientation so that their rotational movements match each other. In other aspects, the rotary shaft 134 of the gas turbine engine 100 and the rotary shaft 240 of the load compressor may be coupled via a torque converter, a gearbox, or a combination thereof, or in any manner suitable for transferring rotational energy from the starter motor 500 to rotary shaft 240 and rotary shaft 134.

The load compressor 200 further includes an inlet 210 that is fluidly coupled to a source of air. In an aspect, the air provided to the load compressor 200 may come from the air source 600. In another aspect, the air can be from a separate source of air, such as another filter house or the ambient atmosphere. An inlet throttle 622 may be positioned upstream from the inlet 210 for regulating the flow of air that is provided from the air source 600 to the inlet 210 (e.g., during startup operation).

The load compressor 200 also includes an outlet 220, from which pressurized air exits the load compressor 200. The outlet 220 is fluidly coupled to a conduit 300. The conduit 300 includes a first end 302 that may be connected to the outlet 220 and a branch point 310 downstream from the first end 302, at which the conduit 300 splits into an exhaust hood path 314 and an exit path 316. A control throttle 312 may be positioned in the conduit 300. The control throttle 312 may be used to regulate the flow of fluid through the load compressor 200. For example, the control throttle 312 may control the flow of compressed air communicated through the outlet 220 and as a result control the power expended by the load compressor 200.

A bypass throttle 321 may be positioned in the exhaust hood path 314. The bypass throttle 321 can be used to regulate the amount of pressurized air that enters the exhaust hood path 314 and the exit path 316 of the conduit 300. The exit path 316 may communicate the pressurized air to an outlet that discharges to the atmosphere. The exhaust hood path 314 is routed to an entry point 415 in the body 420 of the exhaust hood 400 where it enters the exhaust hood cavity 450 of the exhaust hood 400 at a point downstream from the gas turbine engine exhaust port 140. The second end 320 of the exhaust hood path 314 is positioned within the exhaust hood 400 at a point downstream from the gas turbine engine 100 exhaust port 140. The second end 320 of the exhaust hood path 314 may include a nozzle 322, which may be configured to affect the characteristics of the flow of the pressurized air exiting the second end 320. In an aspect, the nozzle 322 may be configured to increase the velocity of the compressed air 230 as it exits the nozzle 322. In an aspect, the nozzle 322 is oriented so that the compressed air exiting it is generally aligned with the downstream direction of the exhaust gas as it flows through the body 420 of the exhaust hood 400 at that position within the exhaust hood cavity 450. For example, the nozzle 322 may be oriented to emit the pressurized air from the load compressor 200 in a vertical direction into the exhaust hood 400 stack.

The system 10 may further include an electric starter motor 500 that has a starter rotary shaft 510 that is mechanically coupled to the load compressor rotary shaft 240 or the rotary shaft 134 via a releasable coupling 520. In an aspect, a torque converter, a gearbox, or a combination thereof may also be used to couple the starter rotary shaft 510 to the load compressor rotary shaft 240 in any manner suitable for the purpose and known in the art. The electric starter motor 500 may be used to start the rotation of the rotary shafts (and connected components) of the gas turbine engine and load compressor until the gas turbine engine reaches a high enough rotary speed to sustain operation of the gas turbine engine and load compressor on its own.

In aspects where the load compressor 200 comes from existing engine, the performance characteristics of such load compressor 200 will be well known. Alternatively, the load compressor 200 may be a compressor rig or component that is developed specifically for use in the system 10. In an aspect, the full speed-full load (FSFL) base load design power output of the gas turbine engine is above the maximum driving power of the load compressor. In an aspect, the maximum driving power of the load compressor 200 is between 50% and 85% of the FSFL design power output of the gas turbine engine 100. In another aspect, the maximum driving power of the load compressor 200 is between 70% and 75% of the FSFL design power output of the gas turbine engine 100.

The system 10 further includes a control system 700 that is communicatively coupled to and able to control the different system components, including but not limited to the controls of the gas turbine engine 100 (e.g., the fuel injector controls), the load compressor 200, the throttles 612, 622, 312, 321, and electric starter motor 500. In an aspect, the control system 700 may include a processor and a memory, with the processor being capable of executing instructions stored in the memory. In an aspect, the control system 700 may also be communicatively coupled to one or more sensors (not shown) on or proximate to the system 10 that measure different operating parameters of one or more system components, the air flow, and/or the local surroundings, such as pressure, temperature, airspeed, flow rate, rotational speed, etc.

Figure 4:
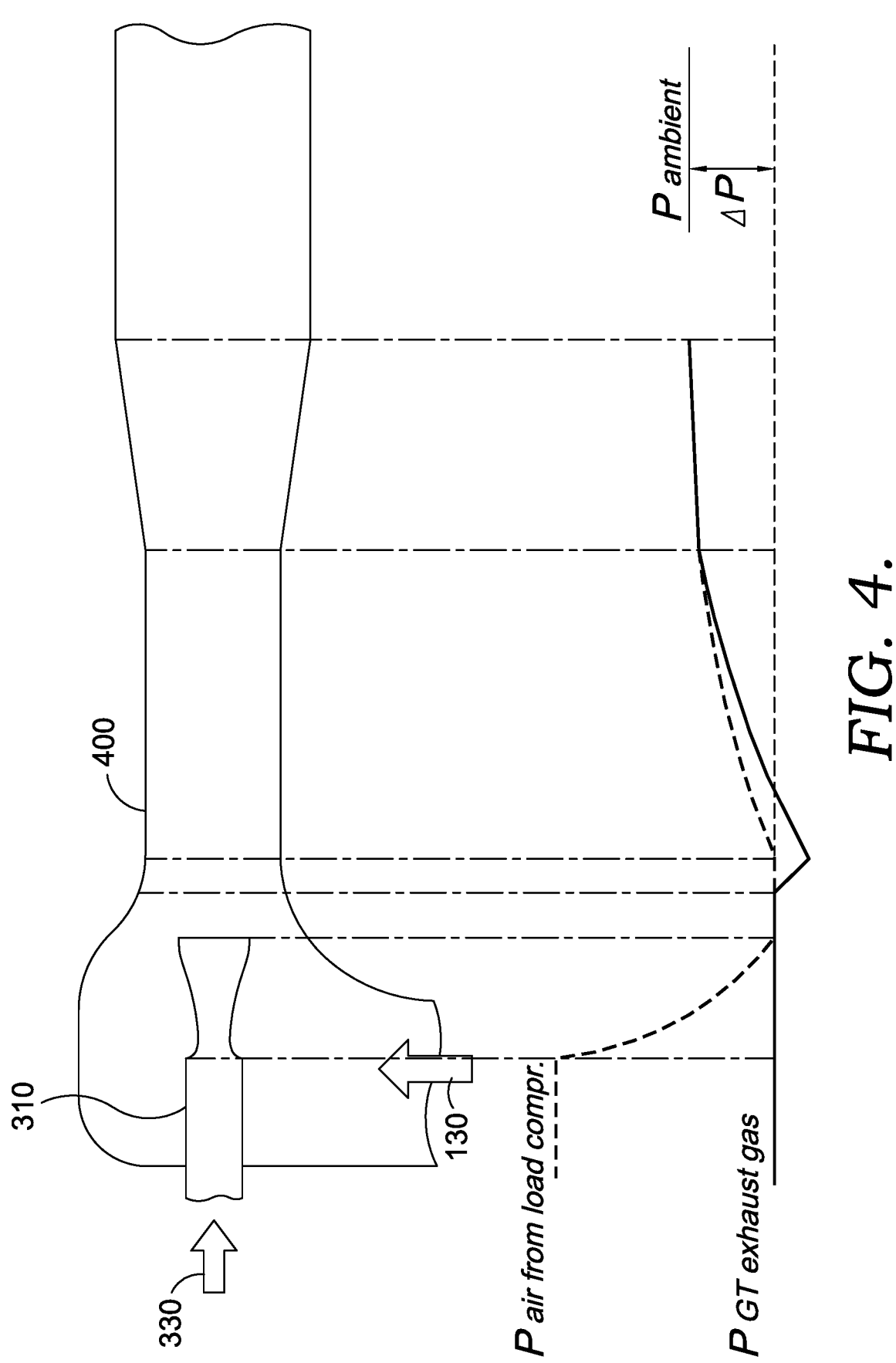
FIG. 4 is a schematic of an exhaust hood in fluid communication with a downstream end of the gas turbine engine illustrated in FIG. 1 along with a graph depicting representative pressures at different points along its length in accordance with an aspect described herein.

In operation, the intake throttle 612 and the pressurized air communicated to the exhaust hood 400 through the exhaust hood path 314 are used to adjust the volume and pressure of the airflows coming into and out of the gas turbine engine 100. Adjusting the volume and/or pressure in this way simulates operating conditions that the gas turbine engine 100 would experience at higher altitudes. For example, using the bypass throttle 321 to introduce compressed air 230 from the load compressor outlet 220 into the conduit 300 and then through nozzle 322 will cause a pressure drop within the exhaust hood 400 that results in a reduced pressure at the gas turbine engine exhaust port 140. This effect is illustrated in the simplified schematic shown in FIG. 4, in which the view of the exhaust hood 400 has been reoriented so that it may be aligned with the simplified pressure graph shown beneath it. The injection of the compressed gas from the nozzle 322 at a higher pressure Pair has the effect of reducing the pressure $P_{GT}$ of the exhaust gas coming out of the exhaust port 140 of the gas turbine engine 100 to below the ambient pressure $P_{ambient}$.

Simultaneously using the intake throttle 612 to simulate conditions of a higher altitude by reducing the airflow from the air source 600 into the intake duct 610 results in a reduced airflow mass entering the gas turbine engine and a reduced pressure at air intake 150. This reduced airflow allows for higher cycle pressure ratios to be tested in the compressor section of the gas turbine engine 100 while generating a lower power output. Adjusting these parameters allows for testing the gas turbine engine 100 across important parts of its operating envelope without exceeding the maximum load of the load compressor 200.

Figure 5:
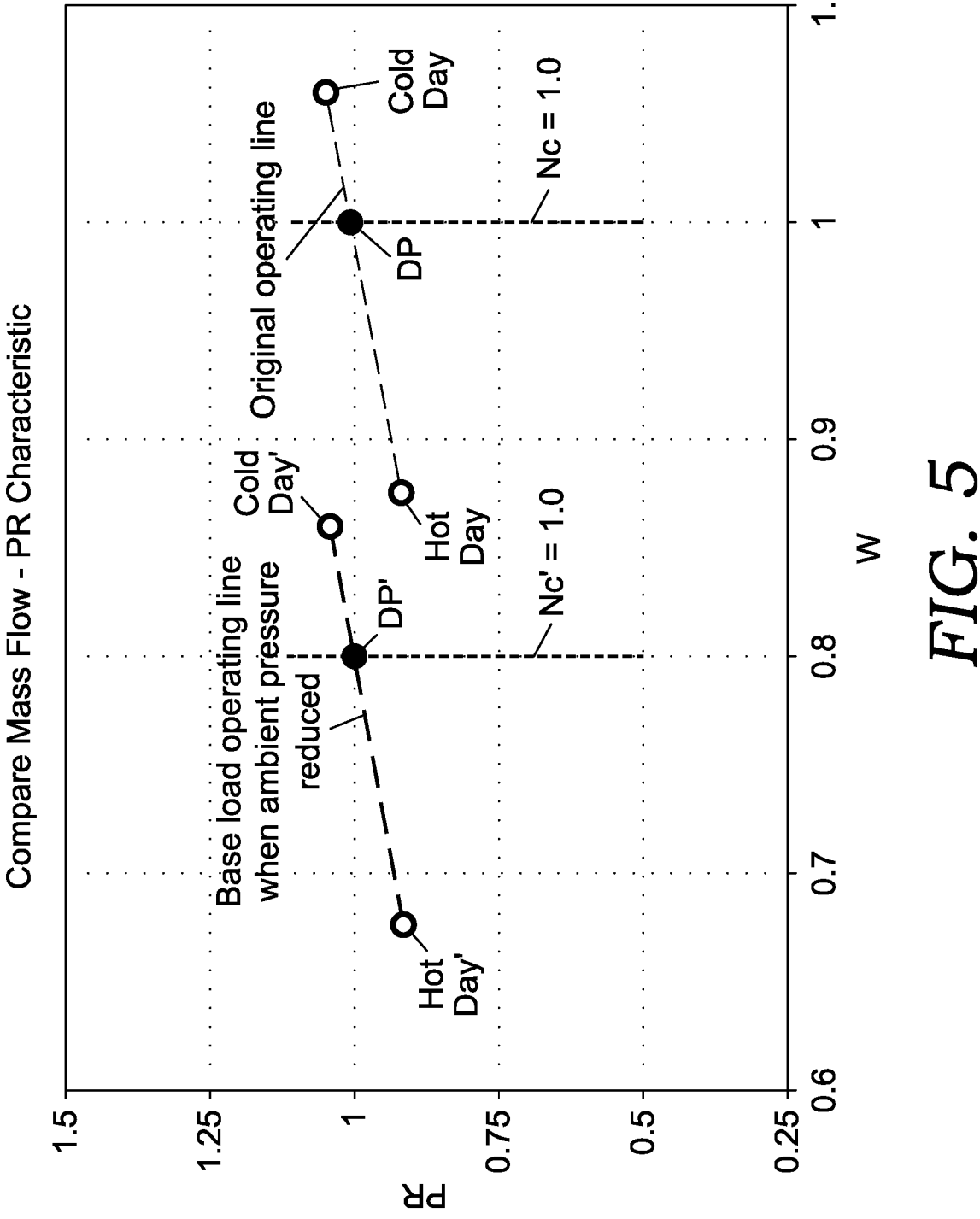
FIG. 5 provides a flow-pressure ratio characteristic (operating line with physical mass flow rate) of the gas turbine engine being tested by an example system in accordance with an aspect described herein.

FIG. 5 demonstrates the effectiveness of the testing apparatus described herein to reduce the intake air flow rate and therefore power output for a given set of operating parameters. FIG. 5 illustrates the base load operating line of the same gas turbine engine 100 of FIG. 2 in comparison with the same base load operating line when the system 10 is configured to simulate an ambient pressure above sea level for the gas turbine engine intake and exhaust hood conditions. As can be seen, the intake air flow rate W across the range of operating pressure ratios along the base load operating line when ambient pressure is reduced is significantly lessened, so that the range of operating conditions, such as those along the base load operating line of the base power mode in the range of ambient air temperatures from extremely cold to extremely hot, can be tested while staying within the operational limits of the load compressor 200. In other words, as shown in FIG. 5, even on a hot day, when ambient pressure is so reduced, the gas turbine engine can be fully tested anywhere along the base load operating line, at the gas turbine engine's operational limits with the Nc and PR being the design point DP (having the Nc'=1.0 and the PR=1), or even at higher operational limits (having the Nc' and the PR greater than 1) without exceeding the temperature limits.

Figure 6:
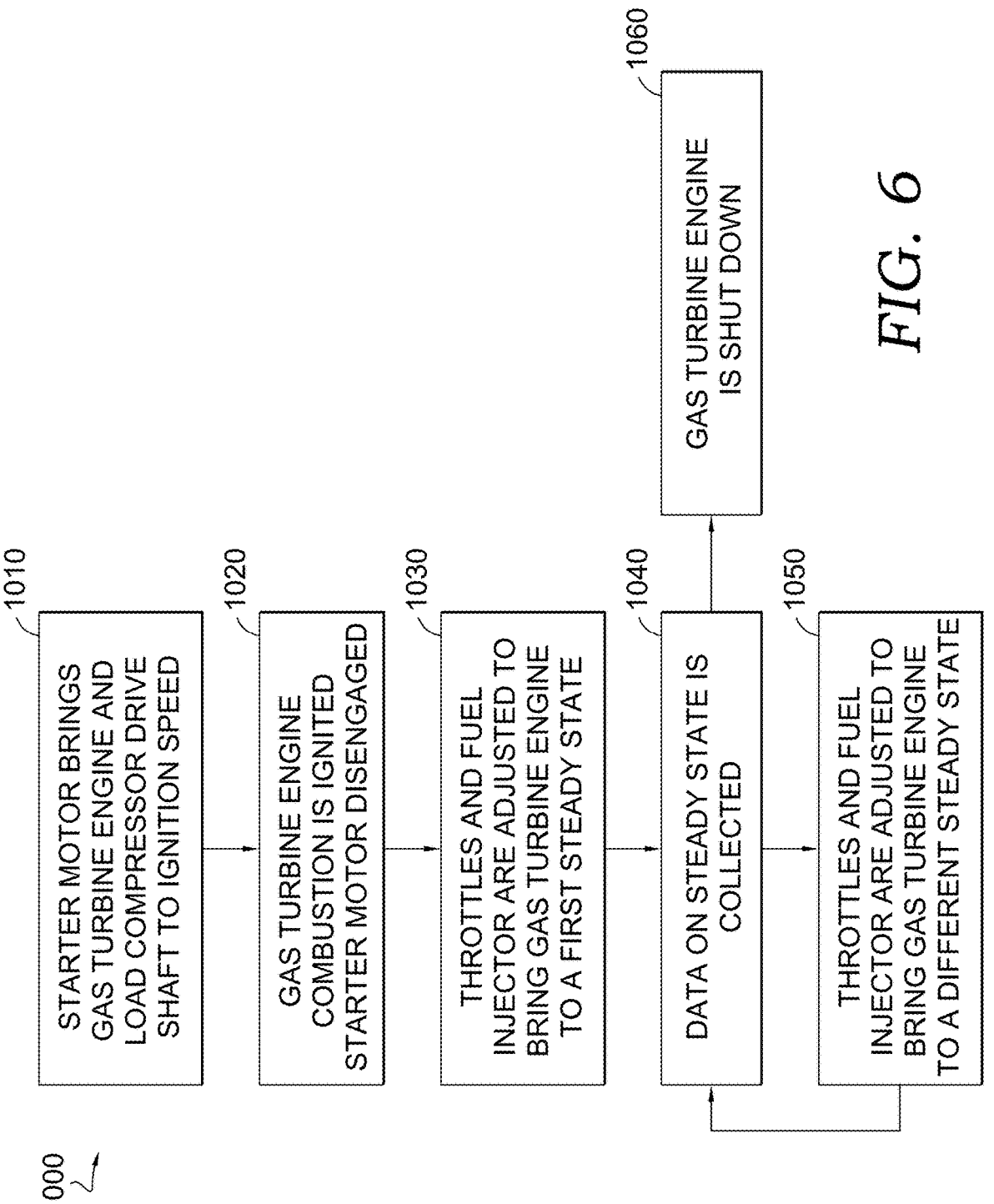
FIG. 6 is a flow chart of a method of validation testing in accordance with an aspect described herein.

With reference to FIG. 6 a validation testing method 1000 is herein described. In step 1010 a starter motor (e.g., electric starter motor 500) is used to drive a rotary shaft of a gas turbine engine (e.g., gas turbine engine 100) and a load compressor (e.g., load compressor 200) to a speed where airflow is sufficient to allow the combustor to be ignited. In step 1020, combustion is initiated and the gas turbine engine increases the rotational speed of the rotary shaft until self-sustaining operational speed is reached, after which the starter motor is disengaged from the rotary shaft. Further, the gas turbine engine is ramped up to FSNL operating condition. In an aspect, inlet throttle 622 can be used to limit the amount of air entering the load compressor 200 (and therefore, the amount of work the gas turbine engine needs to generate in order to increase speed) during one or more of these startup steps. In step 1030 a control system (e.g., control system 700) is then used to adjust one or more operational settings of the system and/or the gas turbine engine so that a first steady state operation of the gas turbine engine is achieved (e.g., ramping up the gas turbine engine from FSNL to a partial load point for testing). The operational settings that may be adjusted include the settings of the system components, such as the gas turbine engine air intake throttle (e.g., intake throttle 612), the load compressor inlet throttle (e.g., inlet throttle 622), the bypass throttle (e.g., bypass throttle) 321, and the nozzle (e.g., nozzle 322), and/or the gas turbine engine, such as the angle of the gas turbine inlet guide vanes or the amount of fuel being injected into the gas turbine engine combustor, among other factors that may be adjusted. In step 1040 data is then collected on one or more parameters or performance characteristics of the gas turbine engine. In step 1050 the operational settings of the system and/or gas turbine engine are then adjusted to bring the gas turbine engine to a second steady state operation. The step of collecting data 1040 is then repeated, and steps 1040 and 1050 may be repeated for additional points of steady state operation for the gas turbine engine until the desired amount of testing is complete.

In examples, the control system is configured so that an operator can fix a first set of one or more variables (e.g., air intake pressure) while being able to adjust one or more of a second set of variables (e.g., amount of fuel being injected), with the control system being able to automatically adjust certain controls accordingly to achieve the desired steady state. In examples, the control system can be programmed with a predetermined testing cycle so that data can be collected across a range of operating conditions as desired.

The terminology used herein is for the purpose of describing specific embodiments only and is not intended to limit the scope of the disclosure. As used herein, the singular forms "a", "an" and "the" are intended to include the plural forms as well, unless the context clearly indicates otherwise. In the disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

While one or more exemplary embodiments have been described with reference to the accompanying drawings, it will be apparent to those skilled in the art that variations and modifications may be made by adding, changing, or removing components without departing from the spirit and scope of the disclosure as defined in the appended claims, and these variations and modifications fall within the spirit and scope of the disclosure as defined in the appended claims.

What is claimed is:

1. A system for off-grid testing of a gas turbine engine with an undersized load compressor, the system comprising:
a gas turbine engine having a full-speed full-load ("FSFL") design power output, the gas turbine engine comprising a compressor having an air intake, a combustor, a turbine, a rotary shaft coupling the turbine to the compressor;
an exhaust hood coupled downstream of the gas turbine engine;
a load compressor having a maximum load smaller than the FSFL design power output of the gas turbine engine, the load compressor mechanically coupled to a rotary shaft of the gas turbine engine, the load compressor having an exhaust port to exhaust high-pressure air from the load compressor;
an intake throttle fluidly connected to the air intake of the compressor of the gas turbine engine, the intake throttle configured to reduce air pressure at the air intake;
an injection nozzle in fluid communication with the exhaust hood of the system; and
a bypass conduit fluidly connecting the exhaust port of the load compressor with the injection nozzle for communicating the high-pressure air from the load compressor to the exhaust hood of the system.

2. The system of claim 1, wherein the maximum load of the load compressor is between 50% and 85% of the FSFL design power output of the gas turbine engine.

3. The system of claim 1, wherein the maximum load of the load compressor is between 70% and 75% of the FSFL design power output of the gas turbine engine.

4. The system of claim 1, further comprising a starter motor releasably coupled to the rotary shaft of the gas turbine engine.

5. The system of claim 1, wherein the injection nozzle is capable of adjusting a velocity of the high-pressure air passing through it.

6. The system of claim 1, further comprising a bypass throttle fluidly connected to the bypass conduit and capable of limiting a flow of the high-pressure air from the load compressor into the bypass conduit.

7. The system of claim 6, further comprising a control system configured to control operation of the system through the various states of a validation test cycle, including startup, shutdown, steady state, partial loads, and full load states.

8. The system of claim 7, wherein the control system is operatively coupled to one or more of the intake throttle connected to the air intake of the compressor of the gas turbine engine, the gas turbine engine's fuel injector, and the bypass throttle.

9. The system of claim 7, further comprising one or more sensors communicatively coupled with the control system and capable of measuring one or more operating conditions within or proximate the gas turbine engine.

10. A method of off-grid testing a gas turbine engine with an undersized load compressor, the method comprising:
mechanically coupling a rotary shaft of the gas turbine engine with a rotary shaft of the load compressor, wherein the gas turbine engine has a full-speed full-load ("FSFL") design power output and the load compressor has a maximum load smaller than the FSFL design power output of the gas turbine engine;
simulating an operating condition for the gas turbine engine using high-pressure air generated by the load compressor; and
generating test data based on the simulation of the operating condition;
wherein the step of simulating an operating condition comprises establishing a first pressure within an exhaust hood of the gas turbine engine that is less than an ambient air pressure.

11. The method of claim 10, wherein the step of simulating an operating condition further comprises establishing an air intake pressure at an air intake of the gas turbine engine that matches the first pressure.

12. The method of claim 11, wherein the exhaust hood is fluidly coupled to a discharge port of the gas turbine engine and a bypass conduit is fluidly coupled between an exhaust port of the load compressor and the exhaust hood, the bypass conduit terminating in an injection nozzle, the method further comprising the steps of:
injecting a portion of a second exhaust from the load compressor into a stream of a first exhaust from the gas turbine engine in the exhaust hood.

13. The method of claim 12, wherein the bypass conduit includes a bypass throttle.

14. The method of claim 11, wherein the air intake pressure is controlled by an intake throttle that is fluidly coupled to the air intake of the gas turbine engine.

15. The method of claim 12 further comprising the steps of:
adjusting an amount of the second exhaust that is injected so that the gas turbine exhaust is at a second pressure that is less than the ambient pressure; and
adjusting the air intake pressure at the air intake of the gas turbine engine to match the second pressure.

16. The method of claim 11, further comprising the step of operating the gas turbine engine at the FSFL design power output for the first pressure.

17. A system for off-grid testing of a gas turbine engine having a full-speed full-load ("FSFL") design power output, the gas turbine engine comprising a compressor having an air intake, a combustor, a turbine, and a rotary shaft coupling the turbine to the compressor, the system comprising:
a load compressor having a maximum load smaller than the FSFL design power output of the gas turbine engine, the load compressor capable of being mechanically coupled to a rotary shaft of the gas turbine engine, the load compressor having an exhaust port;
an intake throttle fluidly connected to the air intake of the compressor of the gas turbine engine, the intake throttle configured to reduce pressure of air at the air intake;

an exhaust hood configured for coupling to the gas turbine engine so that exhaust gas from the turbine can be collected;

an injection nozzle in fluid communication with the exhaust hood; and a bypass conduit fluidly connecting an exhaust port of the load compressor with the injection nozzle for communicating high-pressure fluid from the load compressor to the exhaust hood.

18. The system of claim 17, further comprising a control system configured to control operation of the system through the various states of a validation test cycle, including startup, shutdown, steady state, partial loads, and full load states.

19. The system of claim 18, further comprising one or more sensors communicatively coupled with the control system and capable of measuring one or more operating conditions within or proximate the gas turbine engine; and wherein the control system is operatively coupled to one or more of the intake throttle connected to the air intake of the compressor of the gas turbine engine, the gas turbine engine's fuel injector, and the bypass throttle.

* * * * *